UNITED STATES PATENT OFFICE 2,520,178

2,3-DIARYL-4-THIAZOLIDONES AND THEIR PREPARATION

Alexander R. Surrey, Albany, N. Y., assignor to Sterling Drug Inc., Wilmington, Del., a corporation of Delaware No Drawing. Application March 19, 1948, Serial No. 15,953

16 Claims. (Cl. 260—302)

This invention relates to 2,3-disubstituted-4-thiazolidones and to a process of preparing the same. More particularly it relates to such compounds wherein the 2- and 3-substituents are aryl groups.

The compounds of my invention are those having the formula

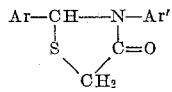

where Ar and Ar' are aryl groups. Such aryl groups include phenyl, 1-naphthyl, 2-naphthyl, 4-methoxyphenyl, 3-nitrophenyl, 4-nitrophenyl, 2-hydroxyphenyl, 3-carbethoxyphenyl, para-tolyl, 4-aminophenyl, 4-chlorophenyl, 3,4-dichlorophenyl, 3,5-dibromophenyl, 4-chloro-1-naphthyl, 4-carboxyphenyl, 3-bromo-1-naphthyl, 3-ethylphenyl, 4-methyl-1-naphthyl, and related groups. The following compounds are illustrative of my invention:

(1) 2,3-diphenyl-4-thiazolidone

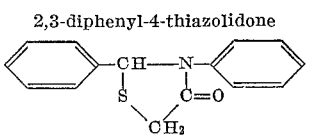

(2) 2-para-tolyl-3-(3-nitrophenyl)-4-thiazolidone

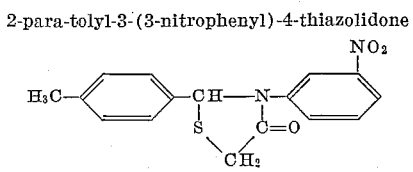

(3) 2,3-di-(4-methoxyphenyl)-4-thiazolidone

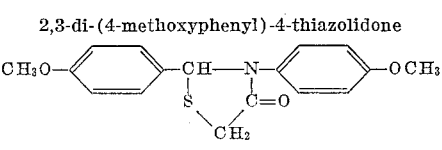

(4) 2-(3-ethoxyphenyl)-3-phenyl-4-thiazolidone

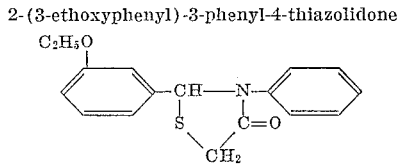

(5) 2-phenyl-3-(3,4-methylenedioxyphenyl)-4-thiazolidone

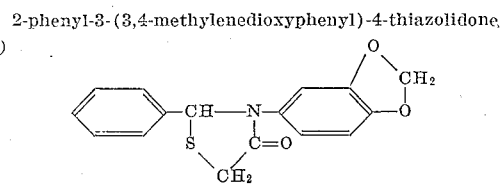

(6) 2-phenyl-3-(3-carbomethoxyphenyl)-4-thiazolidone

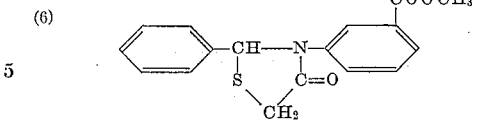

(7) 2-(2-naphthyl)-3-phenyl-4-thiazolidone

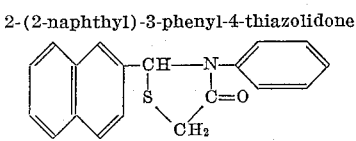

(8) 2-(3,4,5-trimethoxyphenyl)-3-(1-naphthyl)-4-thiazolidone

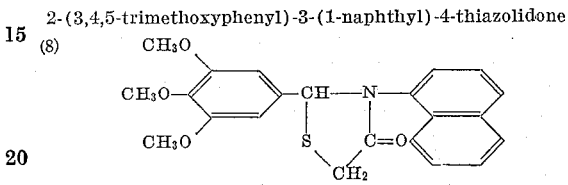

(9) 2-(4-bromophenyl)-3-(3,4-dichlorophenyl)-4-thiazolidone

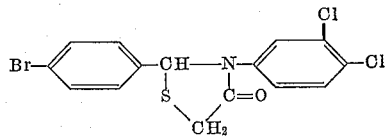

(10) 2-(3-ethylphenyl)-3-(2-hydroxyphenyl)-4-thiazolidone

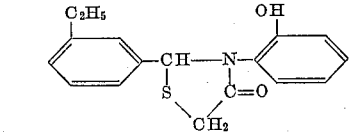

The compounds of my invention are prepared by reacting an anil of the formula, ArCH=NAr', where Ar and Ar' are aryl groups as illustrated above, with thioglycolic acid under a variety of conditions, with or without a solvent. The most satisfactory procedure is to carry out the reaction in refluxing benzene with a continuous separator connected to the apparatus (see illustrations on p. 262 and 422, Organic Syntheses, Collective Volume 1, 2nd ed., N. Y., 1941). In this manner the extent of condensation can be followed and the reaction time determined. In many instances the anil can be prepared in the same solvent. After the calculated quantity of water has been collected, the thioglycolic acid is added and refluxing continued. When the anil is only slightly soluble in benzene, vigorous mechanical stirring is employed. The formation of the thiazolidone ring takes place in two steps, namely, the addition of the thiol group to the anil to give a compound having the formula

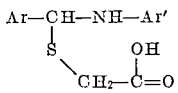

and the ring closure of this intermediate addition compound by splitting out of water. The initial addition step is usually accompanied by the evolution of heat. In a typical example, using as the anil, N-benzylideneaniline (prepared from benzaldehyde and aniline), and a reflux period of about four hours, the resulting product is 2,3-diphenyl-4-thiazolidone.

The above procedure, while being the preferred method of preparing my 2,3-diaryl-4-thiazolidones, can be modified, but usually with diminished yields. For example, the reaction can be run at room temperature for several days in other solvents, such as acetic acid, ethanol, and the like.

Alternatively, the reaction can be carried out by substituting for thioglycolic acid one of its lower alkyl esters. Thus, 2,3-diphenyl-4-thiazolidone is formed when methyl thioglycolate, ethyl thioglycolate, or butyl thioglycolate is allowed to react with N-benzylideneaniline in a boiling hydrocarbon solvent, while removing the methanol, ethanol, or butanol, respectively, as it is formed.

The 2,3-diaryl-4-thiazolidones where one or both of the aryl groups is substituted by an amino radical are readily prepared by reducing the corresponding nitroaryl derivatives. For example, 2 - (4 - aminophenyl) -3-phenyl-4-thiazolidone is formed by reducing in the usual manner 2-(4-nitrophenyl) -3-phenyl-4-thiazolidone.

The intermediate anils, designated above as ArCH=NAr', are prepared readily by warming on a steam bath for one to six hours equimolecular quantities of an aryl aldehyde, ArCHO, and an aryl amine, Ar'NH2. Alternatively, the anils can be prepared by refluxing a mixture of an aryl aldehyde and an aryl amine in benzene from one to six hours in a flask adapted with a continuous separator.

The following examples illustrate specific embodiments of the invention. It is to be understood that the invention is not limited thereto but only by the scope of the appended claims.

Example 1

2,3-diphenyl-4-thiazolidone.—A mixture of 18 g. of N-benzylideneaniline and 9.2 g. of thioglycolic acid is allowed to stand at room temperature for three days. Then ether is added to the reaction mixture and the whole is gently warmed, after which the undissolved solid (about 9 g.) is collected by filtration. On standing, the filtrate yields more of the solid. This solid, which melts at 131.6–2.2° C. (corr.) after recrystallization from benzene-ether, is 2,3-diphenyl-4-thiazolidone of the formula

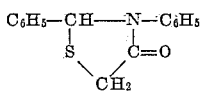

The above reaction also can be run in a suitable solvent; thus, a solution of equimolecular quantities of thioglycolic acid and N-benzylideneaniline in ethanol or glacial acetic acid is allowed to stand at room temperature for two days. The solvent is then removed by distillation in vacuo, and the residue is dissolved in ether. The product which separates is recrystallized from ether to give a 12% yield of 2,3-diphenyl-4-thiazolidone.

A better procedure is the following where the reaction is carried out in refluxing benzene. A mixture of 18 g. of N-benzylideneaniline and 9 g. of thioglycolic acid in 75 ml. of dry benzene is refluxed in a flask adapted with a water separator. After about four hours of refluxing, the benzene solution is concentrated and cooled. Addition of excess ether precipitates the 2,3-diphenyl-4-thiazolidone, which is recrystallized from benzene-ether or ethanol.

Alternatively, this same compound, 2,3-diphenyl-4-thiazolidone, can be prepared by using a lower alkyl thioglycolate in place of thioglycolic acid according to the following procedure: A mixture of 18.1 g. of N-benzylideneaniline and 13.2 g. of ethyl thioglycolate in 180 ml. of petroleum ether (fraction of mixed octanes) is refluxed gently for 16 hours in a flask adapted with a continuous separator. After the solvent has been removed by distilling under reduced pressure, the residue is taken up in ether. The product which separates is collected by filtration and washed with ether. The product melts at 125–7° C.

Example 2

2,3 - di-(4-methoxyphenyl)-4-thiazolidone.—A mixture of 0.4 mole of anisic aldehyde and 0.4 mole of para-anisidine in 250 ml. of benzene is refluxed for two hours in a flask adapted with a continuous separator. Then, 40 g. of thioglycolic acid is added and refluxing continued for twelve hours. The benzene is removed by distillation in vacuo; 500 ml. of ether is added to the residue; and the solid is filtered and washed with ether. This solid, 86 g., is recrystallized from methanol to yield 2,3-di-(4-methoxy)-4-thiazolidone, m. p. 118.9–9.8° C. (corr.), of the formula

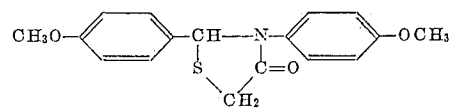

Example 3

2 - phenyl - 3 - (4 - hydroxyphenyl) - 4 - thiazolidone.—A mixture of 19.7 g. of N-benzylidene-para-hydroxyaniline, 9.5 g. of thioglycolic acid, and 175 ml. of benzene is refluxed with stirring for six hours in a flask adapted with a continuous separator. About 1.4 ml. of water is collected. On cooling, there separates a solid which, after being separated from the benzene by decanting or filtering, is triturated with warm ether. The crude product (about 17 g.) is filtered and recrystallized from ethanol, yielding 2-phenyl - 3 - (4 - hydroxyphenyl)-4-thiazolidone, M. P. 191.8–193° C. (corr.), of the formula

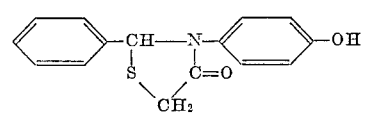

Example 4

2 - phenyl - 3 - (3 - carboxyphenyl) - 4 - thiazolidone. — This preparation is carried out like Example 3 but using 22.5 g. of N-benzylidene-metacarboxyaniline, 10 g. of thioglycolic acid, and 150 ml. of benzene. A reflux period of twelve hours is employed. The crude product is precipitated by adding petroleum ether to the benzene solution. The product is filtered and recrystallized from isopropanol to yield 2-phenyl-3-(3- carboxyphenyl)-4-thiazolidone, M. P. 186.5–8° C. (corr.), of the formula

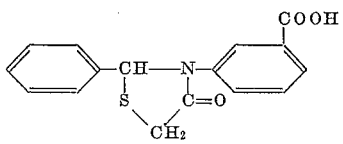

*Example 5*

2 - phenyl - 3 - (4 - carbethoxyphenyl) - 4 - thiazolidone.—The intermediate anil for this preparation is prepared by refluxing for seven hours equimolar quantities of benzaldehyde and 4-carbethoxyaniline in benzene, removing the benzene by distillation, triturating the residual material with petroleum ether to bring about solidification, and crystallizing the solid from petroleum ether to yield a product melting at 46–9° C. This material is used as such without further purification in the reaction with thioglycolic acid, according to the procedure given in Example 3; in such a manner there is used 25.3 g. of N-benzylidene-para-carbethoxyaniline, 10 g. of thioglycolic acid, and 250 ml. of benzene. A reflux time of 15 hours is used. The reaction mixture is then evaporated to one-third the original volume and about an equal volume of ether is added. After this solution has been washed with 10% sodium bicarbonate solution and water, the crude product usually precipitates from the benzene-ether solution on standing or after the addition of more ether. The separated solid is triturated with ether and recrystallized from benzene-ether to yield 2-phenyl-3-(4-carbethoxyphenyl)-4-thiazolidone, M. P. 126.8–8.8° (corr.), of the formula

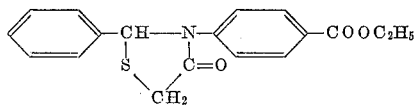

If, in the above example, the anil derived from 2-naphthaldehyde and para-carbethoxyaniline is used in place of N-benzylidene-paracarboxyaniline, the resulting product is 2-(2-naphthyl)-3-(4-carbethoxyphenyl)-4-thiazolidone of the formula

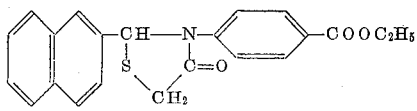

*Example 6*

2 - phenyl - 3 - (2 - hydroxyphenyl) - 4 - thiazolidone.—This preparation is run according to the procedure described in Example 3 but using 36.5 g. of N-benzylidene-ortho-hydroxyaniline, 20 g. of thioglycolic acid, and 250 ml. of benzene. After a reflux period of eight hours, the reaction mixture is allowed to cool whereupon there separates about 23 g. of solid, which is recrystallized from ethanol to yield 2-phenyl-3-(2-hydroxyphenyl)-4-thiazolidone, M. P. 222–4° C. (corr.), of the formula

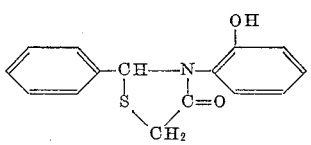

*Example 7*

2 - phenyl - 3 - (3 - chlorophenyl) - 4 - thiazolidone.—The crude anil (21.5 g.), prepared from benzaldehyde and metachloroaniline in benzene followed by removal of the benzene by distillation in vacuo, is allowed to stand at room temperature for five days with 10 g. of thioglycolic acid. Ether is added and the mixture is warmed on the steam bath. After cooling, the solid that separates is filtered (11 g.) and recrystallized from methanol to give 2-phenyl-3-(3-chlorophenyl)-4-thiazolidone, M. P. 128.6–9.6° C. (corr.), of the formula

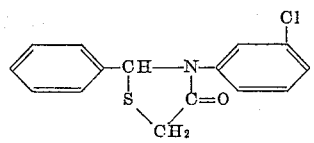

*Example 8*

2 - phenyl-3 - (4 - chlorophenyl) - 4 - thiazolidone.—A mixture of 0.2 mole of benzaldehyde, 0.2 mole of para-chloroaniline, and 100 ml. of benzene is refluxed in a flask adapted with a continuous separator. After 3.5 ml. of water has been collected, 20 g. of thioglycolic acid is added and refluxing is continued until an additional 3.5 ml. of water is collected. The benzene is removed by distilling in vacuo, the residue is dissolved in ether, and the ether solution if allowed to stand whereupon the product (24 g.) precipitates. It is collected and recrystallized first from benzene-ether and then from benzene. This product, 2-phenyl-3 - (4 - chlorophenyl)-4-thiazolidone, melts at 110.8–2.2° C. (corr.) and has the formula

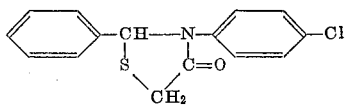

*Example 9*

2 - phenyl-3-(4-carboxyphenyl) - 4 - thiazolidone.—A mixture of 90 g. of N-benzylidene-4-carboxyaniline, 46 g. of thioglycolic acid, and 800 ml. of benzene is refluxed with stirring for seventeen hours in a flask adapted with a continuous separator. About 6.5 ml. of water is collected. The product, being insoluble in hot benzene, is collected by filtering the hot reaction mixture. Several recrystallizations from isopropanol yields the purified product, 2-phenyl-3-(4-carboxyphenyl)-4-thiazolidone, M. P. 235–7° C., of the formula

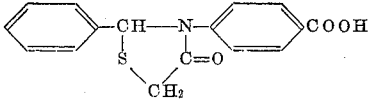

*Example 10*

2-(4 - nitrophenyl) - 3 - (4 - chlorophenyl)-4-thiazolidone.—A mixture of 18.8 g. of N-(4-nitrobenzylidene)-4-chloroaniline, 10 g. of thioglycolic acid, and 150 ml. of dry benzene is refluxed with stirring for eight hours in a flask adapted with a water separator. Almost the theoretical amount of water is collected. The benzene is removed by distillation, the residual material triturated with hot water and sodium carbonate solution, and the resulting crude solid filtered and recrystallized from ether to yield 16.2 g. of material melting at 110–3° C. A sample recrystallized twice from ethanol melts at 115.4–6.3° C. (corr.); this solid is 2-(4-nitrophenyl)-3-(4-chlorophenyl)-4-thiazolidone of the formula

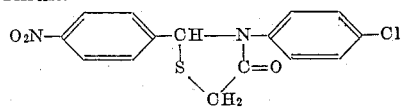

When N-(3-nitrobenzylidene)-4-chloroaniline is substituted for N-(4-nitrobenzylidene)-4-chloroaniline in the above example, there is obtained 2-(3-nitrophenyl)-3-(4-chlorophenyl)-4-thiazolidone, M. P. 160.2–161.6° C. (corr.), of the formula

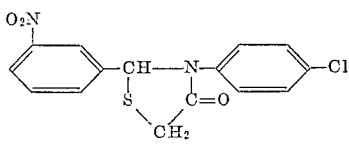

*Example 11*

2-(4-aminophenyl)-3-(4-chlorophenyl)-4-thiazolidone.—A mixture of 10 g. of 2-(4-nitrophenyl)-3-(4-chlorophenyl)-4-thiazolidone, 100 ml. of ethanol, 60 ml. of water, 40 g. of iron filings, and 1.0 ml. of acetic acid is refluxed with stirring for four hours. Excess solid sodium carbonate is added followed by more ethanol, and the mixture is filtered hot. On cooling, there separates about 9 g. of solid, M. P. 147–151° C., which when recrystallized from ethanol melts at 155.3–156.8° C. (corr.). This product is 2-(4-aminophenyl)-3-(4-chlorophenyl)-4-thiazolidone of the formula

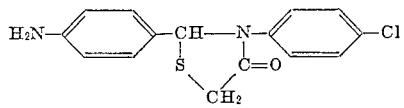

When the above procedure is carried out in the same manner but using, as the starting material, the corresponding 2-(3-nitrophenyl)-3-(4-chlorophenyl)-4-thiazolidone, there is obtained as the final product 2-(3-aminophenyl)-3-(4-chlorophenyl)-4-thiazolidone, M. P. 140.7–141.6° C. (corr.), of the formula

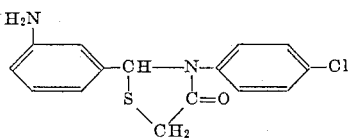

*Example 12*

2,3-di-(3-nitrophenyl)-4-thiazolidone.—A mixture of 72 g. of N-(3-nitrobenzylidene)-3-nitroaniline, 34 g. of thioglycolic acid, and 600 ml. of dry benzene is refluxed for twenty-four hours. On standing, the solution yields 40 g. of solid; evaporation of most of the benzene yields a second crop of 21.5 g. of material. After recrystallization from chloroform, the product melts at 170.6–171.7° C. (corr.). This product is 2,3-di-(3-nitrophenyl)-4-thiazolidone of the formula

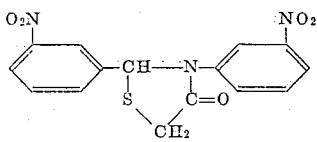

The compounds of my invention are useful as pharmaceuticals and as intermediates in the preparation of pharmaceuticals.

I claim:
1. A 2,3-diaryl-4-thiazolidone where the aryl groups each have 1-2 rings.

2. A compound having the formula

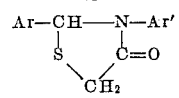

where Ar and Ar' are monocarbocyclic aryl groups.

3. 2,3-di-(4-methoxyphenyl)-4-thiazolidone.
4. 2-phenyl-3-(4-carboxyphenyl)-4-thiazolidone.
5. 2-(4-aminophenyl)-3-(4-chlorophenyl)-4-thiazolidone.
6. The process of preparing a 2,3-diaryl-4-thiazolidone which comprises reacting an anil of the formula, ArCH=NAr', where Ar and Ar' are aryl groups each containing 1-2 rings, with a member of the group consisting of thioglycolic acid and its lower alkyl esters.
7. The process of preparing a compound having the formula

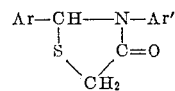

where Ar and Ar' are monocarbocyclic aryl groups, which comprises reacting an anil of the formula, ArCH=NAr', with a member of the group consisting of thioglycolic acid and its lower alkyl esters.
8. The process of preparing a compound having the formula

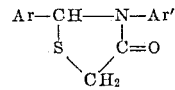

where Ar and Ar' are monocarbocyclic aryl groups, which comprises reacting an anil of the formula, ArCH=NAr', with thioglycolic acid.
9. The process of preparing a compound having the formula

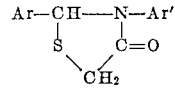

where Ar and Ar' are monocarbocyclic aryl groups, which comprises reacting an anil of the formula, ArCH=NAr', with a lower alkyl ester of thioglycolic acid.
10. The process of preparing 2,3-di-(4-methoxyphenyl)-4-thiazolidone which comprises reacting N-(4-methoxybenzylidene)-4-methoxyaniline with thioglycolic acid.
11. The process of preparing 2-phenyl-3-(4-carboxyphenyl)-4-thiazolidone which comprises reacting N-benzylidene-4-carboxyaniline with thioglycolic acid.
12. The process of preparing 2-(4-aminophenyl)-3-(4-chlorophenyl)-4-thiazolidone which comprises reacting N-(4-aminobenzylidine)-4-chloroaniline with thioglycolic acid.
13. 2-(4-nitrophenyl)-3-(4-chlorophenyl)-4-thiazolidone.
14. 2,3-di-(3-nitrophenyl)-4-thiazolidone.
15. The process of preparing 2-(4-nitrophenyl)-3-(4-chlorophenyl)-4-thiazolidone which comprises reacting N-(4-nitrobenzylidene)-4-chloroaniline with thioglycolic acid.
16. The process of preparing 2,3-di-(3-nitrophenyl)-4-thiazolidone which comprises reacting N-(3-nitrobenzylidene)-3-nitroaniline with thioglycolic acid.

ALEXANDER R. SURREY.

No references cited.